United States Patent [19]

Rao

[11] Patent Number: 5,053,375

[45] Date of Patent: Oct. 1, 1991

[54] ELECTROCHEMICAL CATHODE AND MATERIALS THEREFOR

[75] Inventor: Bhaskara M. L. Rao, Flemington, N.J.

[73] Assignee: Alupower, Inc., Warren, N.J.

[21] Appl. No.: 462,019

[22] Filed: Jan. 8, 1990

[51] Int. Cl.$^5$ ............................................... H01M 4/88
[52] U.S. Cl. .................................. 502/101; 427/115; 429/42
[58] Field of Search ............ 429/27, 42; 427/115; 502/101

[56] References Cited

U.S. PATENT DOCUMENTS

| | | | |
|---|---|---|---|
| 3,682,707 | 8/1972 | Sandler | 429/42 |
| 4,569,924 | 2/1986 | Ozin et al. | 502/101 X |
| 4,603,118 | 7/1986 | Staab | 502/101 |
| 4,885,217 | 12/1989 | Hoge | 429/27 |
| 4,906,535 | 3/1990 | Hoge | 429/42 |

Primary Examiner—Stephen J. Kalafut
Attorney, Agent, or Firm—Louis E. Marn

[57] ABSTRACT

There is disclosed a process for producing an electrochemical cathode for an electrochemical cell comprised of a current collecting layer or substrate laminated to a layer of a nonwoven conductive fibrous web, preferably of conductive carbon fibers, impregnated with a mixture of silver-containing carbon particles and a nonfibrous polymeric substance, and optionally with a hydrophobic microporous film or layer disposed on one of the layers of the nonwoven conductive fibrous web, as well as the product produced thereby.

14 Claims, 2 Drawing Sheets

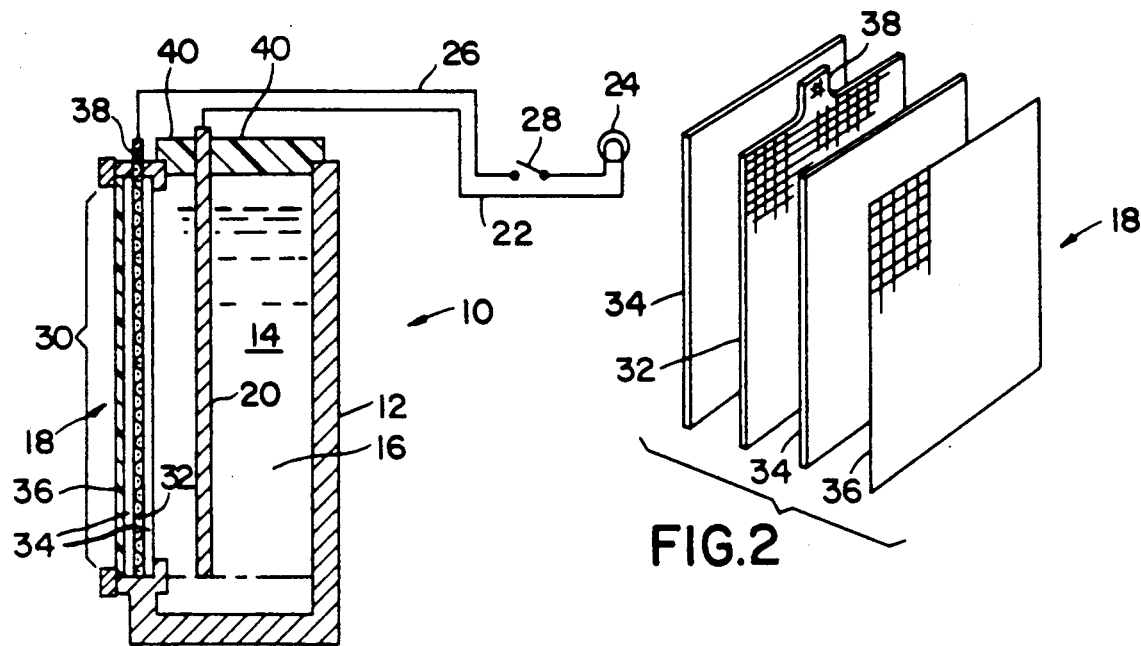
FIG.1
FIG.2
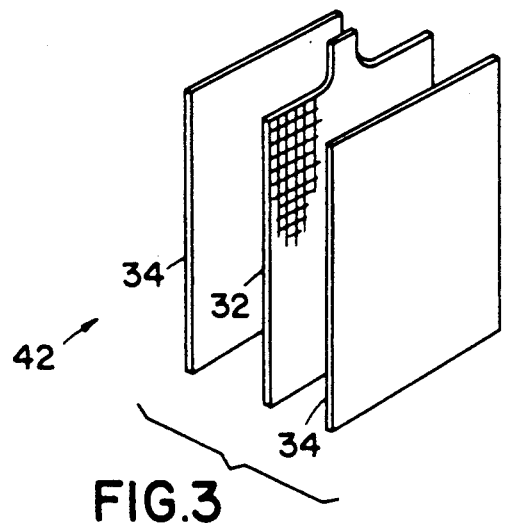
FIG.3

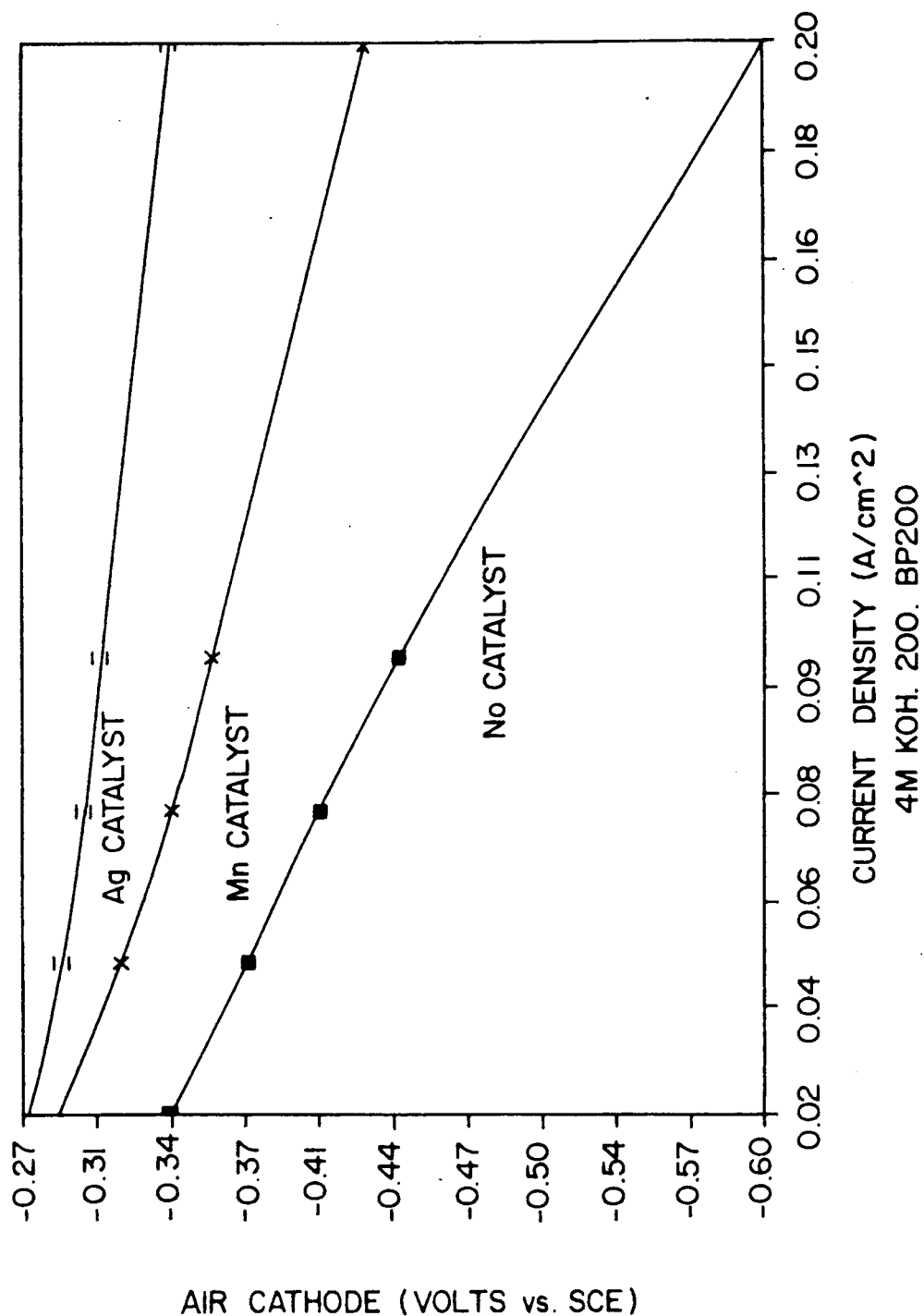

ELECTROCHEMICAL CATHODE AND MATERIALS THEREFOR

BACKGROUND OF THE INVENTION (1) Field of the Invention

This invention relates to a process for manufacturing electrodes and electrodes produced thereby, and more particularly to a process for manufacturing electrochemical cathodes for use in electrochemical cells and electrochemical cathodes produced thereby.

(2) Description of the Prior Art

Metal/air batteries produce electricity by electrochemically coupling in a cell a reactive metallic anode to an air cathode through a suitable electrolyte. As is well known in the art, an air cathode is a typically sheet-like member having opposite surfaces respectively exposed to the atmosphere and to an aqueous electrolyte of the cell, in which (during cell operation) atmospheric oxygen dissociates while metal of the anode oxidizes providing a usable electric current flow through external circuitry connected between the anode and cathode. The air cathode must be permeable to air but substantially hydrophobic (so that aqueous electrolyte will not seep or leak through it), and must incorporate an electrically conductive element for external circuitry.

In present-day commercial practice, the air cathode is commonly constituted of active carbon (with or without an added dissociation-promoting catalyst) containing a finely divided hydrophobic polymeric material and incorporating a metal screen as the conductive element. A variety of anode metals are used including iron, zinc, magnesium, aluminum, alloys of aluminum, etc. Alloys of aluminum and magnesium are considered especially advantageous for particular applications owing to low cost, light weight and ability to function as anodes in metal/air batteries using neutral electrolytes, such as sea water or other aqueous saline solutions. Metal/air batteries have an essentially infinite shelf-storage life rendering them very suitable for standby or emergency uses in that the metal-air battery may be activated by addition of electrolyte.

While such an air cathode have been effective, there is a continuing desire to increase current densities at cost effective processing, etc. of such air cathode.

OBJECTS OF THE INVENTION

An object of the present invention is to provide an improved cathode for electrochemical cells.

Another object of the present invention is to provide an improved electrochemical cathode for electrochemical cells providing improved electrochemical characteristics.

A further object of the present invention is to provide an improved electrochemical cathode for electrochemical cells exhibiting improved retention of the catalyst in systems using alkaline electrolytes.

Still another object of the present invention is to provide a novel process for producing an, improved cathode for electrochemical cells.

Yet another object of the present invention is to provide a novel process for producing an improved cathode for electrochemical cells exhibiting improved electrochemical characteristics, such as improved corrosion resistance.

SUMMARY OF THE INVENTION

These and other objects of the present invention are achieved by a process for producing an electrochemical cathode for an electrochemical cell comprised of a current collecting layer or substrate laminated between layers of a nonwoven conductive fibrous web, preferably of conductive carbon fibers, impregnated with a mixture of silver-containing carbon particles and a nonfibrous polymeric substance, and optionally with a hydrophobic microporous film or layer disposed on one of the layers of the nonwoven conductive fibrous web as well as the product produced thereby.

BRIEF DESCRIPTION OF THE DRAWINGS

Other features and advantages of the present invention will become more readily apparent from the following detailed description when taken with the accompanying drawings wherein;

FIG. 1 is a schematic elevational sectional view of an electrochemical metal/air battery incorporating an electrochemical cathode of one embodiment of the present invention;

FIG. 2 is a schematic exploded view of the embodiment of an electrochemical cathode of FIG. 1;

FIG. 3 is a schematic exploded view of another embodiment of an electrochemical cathode, such as for a lithium battery, of the present invention; and FIG. 4 is a graph illustrating improved performance achieved by the use of silver-containing carbon particles in a air cathode.

DETAILED DESCRIPTION OF THE INVENTION

In copending application Ser. No. 07/070,183, there is disclosed an air cathode comprised of a sheetlike laminate including first and second layers having opposed major surfaces, respectively, exposed for contact with a liquid electrolyte and with air, and having facing major surfaces. The second layer is permeable to air but not to a liquid electrolyte. A current-collecting layer is in contact with the first layer and is connected to external electrical circuitry. The first layer of the cathode is comprised of a nonwoven fibrous web, preferably of conductive carbon fibers, impregnated with a mixture of carbon particles and a nonfibrous polymeric substance for holding the carbon particles in the web.

The facing major surfaces of the first and second layers are bonded together by heat seal coating material distributed on facing major surfaces in manner to provide an array or network of areas free of coating material extending substantially uniformly thereover with the coating material being distributed as a multiplicity of spaced-apart dots, or as a mesh having coating-material-free interstices. Coating-free spaces maintains sufficient unclogged pores in the second layer to enable the air cathode to function as intended, yet with effective lamination of the layers to each other and/or to the current-collecting means, such as a layer of metal mesh interposed between and coextensive with the first and second layer.

In copending application Ser. No. 07/287,482, filed Dec. 20, 1988, there is disclosed a process for forming an improved air cathode and the resulting air cathode comprised of an electrochemical cell comprised of a current collecting layer or substrate laminated between layers of a nonwoven conductive fibrous web, preferably of conductive carbon fibers, impregnated with a mixture of carbon particles and a nonfibrous polymeric substance, and optionally with a hydrophobic microporous film or layer disposed on one of the layers of the nonwoven conductive fibrous web as well as the product produced thereby.

Referring now to FIG. 1, there is illustrated a metal-/air battery, generally indicated as 10 comprised of a housing 12 defining a chamber 14 for receiving a liquid electrolyte 16, such as an aqueous solution of sodium chloride; an air cathode, generally indicated as 18, and a metal anode 20. The anode 20 is connected by line 22 to a light bulb 24 connected by line 26 including a switch 28 to the air cathode 18. The housing 12 defines a large vertical aperture 30 for receiving the air cathode 18 in liquid-tight fashion with the periphery of the air cathode 18 sealed to the periphery of the aperture 30 of the housing 12. Closing of the switch 28 closes an electrical circuit formed between the air cathode 18 and the anode 20 via the electrolyte 16 thereby illuminating the light bulb 24.

The air cathode 18 is a laminate structure comprised of a metal mesh substrate 32, reactive layers 34 laminated to the mesh substrate 32 and a hydrophobic microporous layer 36 mounted to the outer reactive layer 34. The metal mesh 32, is the current collector of the metal/air battery 10, and is formed of a suitable metallic material, such as nickel, stainless steel and the like, formed for example by expanded metal techniques and includes an upwardly extending tab portion 38 for connection to line 26.

The anode 20, may be formed of a suitable anodic material, such as aluminum, magnesium or the like, and is illustrated as being disposed in a top 40 of the housing 12 in the form of a plate member extending vertically into the chamber 14 including the electrolyte 16. The anode 20 is longitudinally disposed with reference to the housing 12 and is spaced apart in parallelled relationship to the air cathode. 18 a distance sufficient to form a gap therebetween for the electrolyte 16. The general arrangement of the metal/air battery 10 may be substantially the same as that of one of the cells of the plural-cell battery, such as described in U.S. Pat. No. 4,626,482 hereby incorporated by reference.

In FIG. 3, there is illustrated an electrochemical cathode, generally indicated as 42, constituting another embodiment of the present invention and a laminate structure comprised of the metal mesh substrate 32 laminated between an inner reactive layer 34 and an outer reactive layer 34 without any hydrophobic microporous layer mounted to an outer reactive layer 34. Such embodiment of the present invention finds application in the lithium battery art.

The reactive layer 34 is comprised of a conductive nonwoven fibrous web impregnated with a mixture of silver-containing carbon particles and a nonfibrous polymeric substance for holding the carbon particles in the web. Other substances e.g. catalyst, may also be included in the impregnating mixture. The nonwoven fibrous web of the present invention is preferably formed of electrically conductive carbon fibers having a length of from about 0.5 to 1.25 inches and a diameter of from about 5.0 to 15.0 $\mu$. The carbon content of such carbon fibers is preferably at least about 90 weight percent exhibiting a resistance of less than about 20 ohms/sq.

The conductive nonwoven fibrous web is formed into a thickness of from 5 to 20 mils, exhibiting a pore volume of at least about 90 percent, to provide a high pick-up of the impregnation mixture whether in suspension or in a coating format. The impregnation mixture should increase the basic weight of the conductive nonwoven fibrous web by about 20 to 120 g./m.$^2$ as a function of solids content of the impregnation suspension or coating and pore volume of the conductive nonwoven fibrous web, and provide a front-to-back (F/B) electrical conductivity of less than about 1 ohm.

The impregnation mixture, in the form of a suspension or coating, is comprised of silver-containing carbon particles, generally in the form of silver-containing carbon black, a nonfibrous adhesive polymeric material to bind the carbon particles to the web and a dispersion or mixing agents. The carbon particles are preferably of small size, expressed as surface area (m.$^2$/g.), generally in excess of 1000, and preferably greater than about 1250, such as Black Pearls 2000, available from Cabot Corporation having a mean particle diameter of 0.015 $\mu$.

An aqueous slurry of the carbon particles is admixed with a solution of water soluble silver salt, such as silver nitrate preferably in an amount to be quantitatively absorbed by the carbon particles. The quantity of silver adsorbed by carbon is a formation of the structure of the carbon particles and generally is time dependent capable of being accelerated by heating the admixture. While the mechanism of silver adsorption is not completely understood, nor is the present invention to be limited thereby, it is believed that silver is fixed to the carbon by 1) ion exchange by carboxylic groups, 2) electrochemical reduction of silver ions by carbon. As readily appreciated, other mechanisms may occur to effect silver adsorption in the carbon particles. Silver adsorption may be quantitatively effected and determined by the formation of silver chloride precipitate (silver chloride) results once a maximum capacity of adsorption of silver is exceeded in the preparation of the silver-containing carbon slurry.

The nonfibrous adhesive polymeric materials include the polytetrafluoroethylenes, such as Teflon ® T-30, a registered trademark of duPont. The dispersion mixing agents include the sodium salt of polymeric naphthalene sulfonic acid and those included with the polytetrafluoroethylene PTFE). Generally, the nonfibrous adhesive polymeric material and dispersing and/or mixing agents are added subsequent to the slurry of silver containing carbon particles.

The conductive nonwoven web of carbon fibers is impregnated by immersion, coating extrusion or the like, with the aqueous suspension of the impregnation mixture of the silver-containing carbon particles, nonfibrous polymeric substance and/or other desired nonfibrous ingredients.

The impregnated conductive nonwoven fibrous web is dried at a temperature of from about 150° to 400° F., a temperature below the sintering temperature of the binder material, i.e. the PTFE, and a temperature high enough to ensure substantially complete moisture removal.

The microporous or hydrophobic layer 36 is a film or web permeable to air but impermeable to the solvent of the electrolyte system to prevent or minimize penetration of the electrolyte through the air cathode to the exterior of the metal/air battery 10 with concomitant disappearance of active interface sites. The hydrophobic layer 36 is laminated on the reactive layer 34 for intended use particularly in conjunction with liquid electrolytes. It has been found that a film of polymeric hydrophobic material, such as films of polytetrafluoroethylene of a thickness of from 2 to 10 mils embossed with mesh of a netted configuration of 1/30th" to ⅛th" diameter provides particularly desirable hydrophobic properties while concomitantly providing for effective diffusion of a gaseous fuel. Embossing of the polymeric hydrophobic layer may be readily effected by passage through an embossing roller assembly maintained at a temperature of from 150° to 300° F., generally at a temperature to compact the film at the contact points or areas of the embossing roll. Wire mesh used to form the current collector layer has been found effective in embossing the polymeric hydrophobic layer.

As disclosed in the aforementioned copending application, the layers of the air cathode laminate 18 are bonded by a discontinuous heat seal coating applied to the reactive layers as a discontinuous dot matrix system or an interposed layer of meshed coating material to be subsequently heated and subjected to a pressure step during passage of the air cathode laminate through a pressure roller system (not shown). Bonding of a reactive layer to the metal mesh substrate is particularly effectively performed by passing the metal mesh substrate 38 through a liquid solution and then dried, or dispersion of a sealing material prior to lamination with a reactive layer 34. In this aspect of the present invention, the sealing material is a Teflon ® dispersion in water.

The reactive layers 34 with seal coating either applied as a dot pattern on inner facing major surfaces surfaces or heat seal netting material (not shown) interposed are juxtaposed to the current collecting substrate 32 in a "sandwich" of layers, and the sandwich subjected to bonding heat and pressure sufficient to activate the heat seal coating to bond the reactive layers 34 to the metal substrate 32. The materials of the electrochemical cathode are selected such that activation temperatures of the heat-seal coating to bond the layers does not damage any layers or component substance, generally a temperature less than 250° F. The hydrophyllic layer 36 may be simultaneously laminated to one of the reactive layers 34 as part of the laminate sandwich, or in a separate but like bonding step. Once the layers are bonded, the resulting laminate is cut to size to provide the individual electrochemical cathodes.

Increased silver adsorption is achieved by effecting the use of hydrogen peroxide, hydrazine, formaldehyde or like reducing agents or by the oxidizing of the carbon, such as with peroxy disulfate in the preparation of the carbon particle slurry prior to admixture with the silver containing solution.

The process of the present invention is set forth in the following specific examples which are intended to be merely illustrative and the present invention is intended not to be limited thereto.

EXAMPLE

A conductive nonwoven web of carbon fibers (International Paper Company), is introduced into a continuous web machine to effect coating and drying operations. The impregnated mixture (silver-containing carbon/Teflon ®) is comprised of 45 gms. of an aqueous dispersion of Black Pearls (carbon) 2000 (15% solids) in 300 grams of deionized water to which is added 158 gms. of 4% silver nitrate. Thereafter, 180 gms. of 10% Daxad (sodium salt of polymerized naphthalure sulfuric acid) is added followed by the addition of 36 gms. Teflon ® T-30 (60% solids). Impregnation is effected to provide an add-on of 75 GSM. The resulting impregnated layers and fine nickel mesh (Delker) precoated with an adhesive are passed through an oven maintained at a temperature of from 200° to 300° F. and thence web and passed through laminating rolls at nip pressure of 600 pounds per lineal inch at a temperature of 250° F. to form an electrochemical cathode suitable for use in an electrochemical battery.

While the invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed:

1. A process for forming an electrochemical cathode, which comprises:
   a) admixing a slurry of carbon particles with a solution of silver salt to form a slurry of silver salt and carbon particles;
   b) thereafter effecting adsorption of Ag° onto said carbon particles in said slurry of step a) prior to step c) to thereby form a slurry of Ag°-adsorbed carbon particles;
   c) impregnating a conductive nonwoven fibrous web with a dispersion comprised of said Ag°-adsorbed carbon particles and a nonfibrous polymeric material for holding said Ag°-adsorbed carbon particles to said web; and
   d) laminating a current collecting substrate to said impregnated web to form said electrochemical cathode.

2. The process for forming an electrochemical cathode as defined in claim 1 wherein concentration of said silver salt in said solution is in an amount sufficient to form a silver precipitate after step (a).

3. The process for forming an electrochemical cathode as defined in claim 1 wherein said slurry of Ag°-adsorbed carbon particles includes a reducing agent.

4. The process for forming an electrochemical cathode as defined in claim 1, and further including the steps of forming and drying a sandwich of said current collecting substrate and said layers of said impregnated web prior to step c).

5. The process for forming an electrochemical cathode as defined in claim 2 wherein drying is effected at a temperature of from 200° to 300° F.

6. The process for forming an electrochemical cathode as defined in claim 1, 2 or 3 wherein said current collecting substrate is coated with a polytetrafluoroethylene dispersion.

7. The process for forming an electrochemical cathode as defined in claim 6, wherein laminating is effected at a temperature of about 150° to about 400° F.

8. The process for forming an electrochemical cathode as defined in claim 1 wherein said nonfibrous polymeric material is polytetrafluoroethylene.

9. The process for forming an electrochemical cathode as defined in claim 3 and further including a polymeric film in said sandwich in contact with one of said layers of said impregnated web.

10. The process for forming an electrochemical cathode as defined in claim 4 and further including a polymeric film in said sandwich in contact with one of said layers of said impregnated web.

11. The process for forming an electrochemical cathode as defined in claim 4 or 5 wherein step b), is effected with an embossing roller in contact with said polymeric film 12. The process for forming an electrochemical cathode as defined in claim 4 or 5 wherein said current collecting substrate is coated with a polytetrafluoroethylene dispersion prior to step c).

13. The process for forming an electrochemical cathode as defined in claim 8 wherein drying is effected at a temperature of from 200° to 300° F.

14. The process for forming an electrochemical cathode as defined in claim 11 wherein step c) is effected with an embossing roller in contact with said polymeric film.

* * * * *